(12) United States Patent
Nordström

(10) Patent No.: US 7,410,128 B2
(45) Date of Patent: Aug. 12, 2008

(54) TRANSPORT DEVICE IN CARGO SPACES IN AIRCRAFTS

(75) Inventor: Claes Nordström, Särö (SE)

(73) Assignee: Telair International AB, Lund (SE)

( * ) Notice: Subject to any disclaimer, the term of this patent is extended or adjusted under 35 U.S.C. 154(b) by 516 days.

(21) Appl. No.: 10/515,092

(22) PCT Filed: May 21, 2003

(86) PCT No.: PCT/SE03/00816

§ 371 (c)(1), (2), (4) Date: Nov. 19, 2004

(87) PCT Pub. No.: WO03/097454

PCT Pub. Date: Nov. 27, 2003

(65) Prior Publication Data

US 2005/0224658 A1   Oct. 13, 2005

(30) Foreign Application Priority Data

May 22, 2002   (SE) .................................. 0201523

(51) Int. Cl.
*B64D 9/00* (2006.01)
*B64C 1/22* (2006.01)
*B60P 1/36* (2006.01)

(52) U.S. Cl. .................. 244/137.1; 244/118.1; 414/528

(58) Field of Classification Search .............. 244/118.1, 244/118.2, 137.1, 137.2; 198/860.1, 860.2, 198/861.1, 861.2; 414/527, 528

See application file for complete search history.

(56) References Cited

U.S. PATENT DOCUMENTS

| | | | | |
|---|---|---|---|---|
| 909,833 A * | 1/1909 | Vrooman | .................... | 198/827 |
| 3,753,541 A * | 8/1973 | Grueber et al. | ........... | 244/137.1 |
| 4,216,927 A * | 8/1980 | Byrd | ........................ | 244/118.1 |
| 4,524,864 A * | 6/1985 | Peterson, II | .................. | 198/828 |
| 4,635,883 A * | 1/1987 | Hamilton et al. | ......... | 244/137.1 |
| 4,805,852 A * | 2/1989 | Nordstrom | ............... | 244/137.1 |
| 4,860,973 A * | 8/1989 | Fenner | .................... | 244/137.1 |
| 4,878,635 A * | 11/1989 | Nordstrom | ............... | 244/137.1 |
| 4,917,232 A * | 4/1990 | Densmore | .................... | 198/830 |
| 4,932,516 A * | 6/1990 | Andersson | .................. | 198/823 |
| 4,984,756 A | 1/1991 | Anders | | |
| 5,046,690 A | 9/1991 | Nordstrom | | |
| 5,163,801 A | 11/1992 | Nordstrom | | |
| 5,170,968 A * | 12/1992 | Helmner | .................. | 244/137.1 |
| 5,184,366 A * | 2/1993 | Rawdon et al. | ............. | 14/71.5 |
| 5,186,596 A * | 2/1993 | Boucher et al. | ............. | 414/395 |
| 5,271,492 A * | 12/1993 | Lewin et al. | ................ | 198/830 |
| 5,275,858 A * | 1/1994 | Hock | .......................... | 428/58 |
| 5,341,920 A * | 8/1994 | Riffe | .......................... | 198/825 |
| 6,367,615 B1 | 4/2002 | Helmner | | |
| 6,517,028 B2 * | 2/2003 | Huber | ..................... | 244/137.1 |
| 6,616,103 B2 * | 9/2003 | Marrero | .................... | 244/137.1 |
| 6,679,491 B2 * | 1/2004 | Luebben et al. | ............. | 271/150 |
| 2003/0034234 A1 * | 2/2003 | Neumann | .................... | 198/840 |

* cited by examiner

*Primary Examiner*—Michael R. Mansen
*Assistant Examiner*—Joseph W Sanderson
(74) *Attorney, Agent, or Firm*—Baker & Hostetler LLP

(57) ABSTRACT

The present invention relates to a transport device in cargo spaces in aircrafts, the transport device including a frame structure which, using retaining devices, is provided at the fuselage in the cargo space. The frame structure includes at least one conveyor belt for transport and storage of goods in the cargo space. The retaining devices are provided to retain the frame structure at the fuselage such that it can move in the retaining devices when it is subjected to abnormally high loads.

45 Claims, 13 Drawing Sheets

TRANSPORT DEVICE IN CARGO SPACES IN AIRCRAFTS

The present invention relates to a transport device useful in cargo spaces in aircrafts. The transport device includes a frame structure which, by means of retaining devices, is provided at the aircraft body in the cargo space. The frame structure includes at least one conveyor belt for transporting and storing goods in the cargo space.

In the above-mentioned transport devices, the frame structure is retained at the aircraft body by means of a plurality of retaining devices which normally are provided at successive locations along the frame structure. These retaining devices are provided to retain the frame structure relative to the aircraft body if the frame structure is subjected to normal loads during normal air transport. If, however, abnormal and shock-like loads are generated during the air transport—which cannot be excluded, for example, during hard landings with abnormal shock-like ground contact—there is a risk that one or some of the retaining devices is/are loaded in a shock-like manner more than other retaining devices and with abnormal loads. This can cause damage on the aircraft body at such locations where the one or some retaining devices are provided, which of course is unacceptable.

The object of the present invention is to eliminate the problem by means of a simple and reliable device.

Since the retaining devices have a yielding capacity, allowing the frame structure to move therein, if one or some of the retaining devices are subjected to abnormal forces by the frame structure, the frame structure can move therein such that the abnormal forces can be taken up by further retaining devices (i.e., the forces are distributed among more retaining devices).

The invention will be further described below with reference to the accompanying drawings, in which FIG. 1 illustrates an aircraft with partly cut fuselage and transport devices according to the invention provided therein;

FIGS. 3 and 3a-3c illustrate a group of transport devices according to the invention from behind and parts of each such transport device with plan views;

Figure 1:
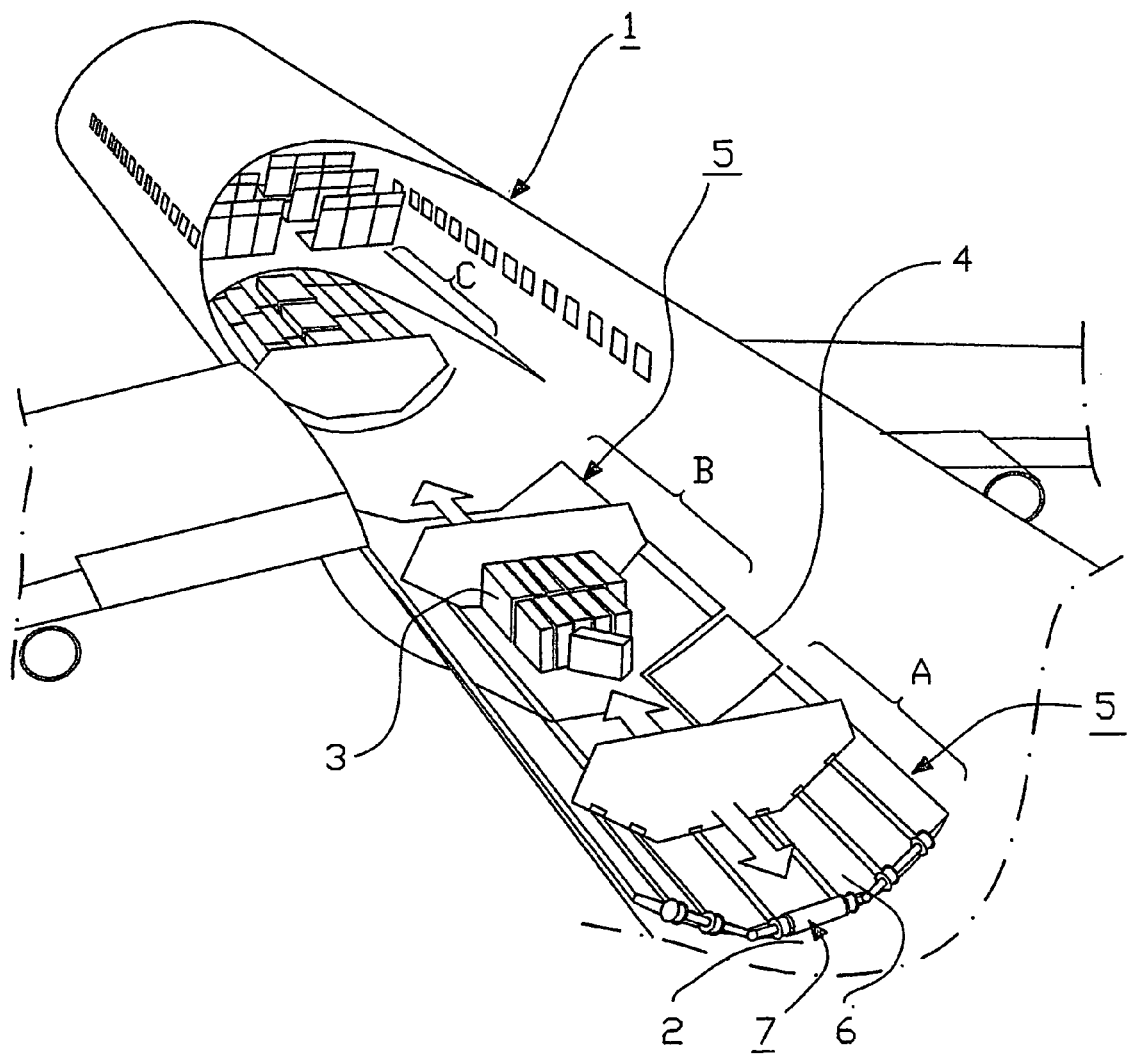

In FIG. 1, an aircraft 1 is illustrated, including a cargo space 2 for cargo or goods 3 (e.g. trunks, bags, packages or similar). The aircraft 1 has a door opening 4 through which the goods 3 can be lifted into the cargo space 2.

The cargo space 2 has at least one transport device 5 (i.e., transport element) for facilitating loading of goods 3 into the cargo space 2. In the embodiment shown, the transport device 5 consists of three parts and it is adapted to transport goods 3 loaded through the door opening 4 and placed thereon, farther into the cargo space 2 (i.e. in a direction away from the door opening 4). When goods 3 are moved away from the door opening 4 and farther into the cargo space 2, space is provided for loading additional goods 3 through the door opening 4 and placing it on the transport device 5. This can continue until the cargo space 2 is completely loaded.

The transport device 5 is also adapted to facilitate unloading of the cargo space 2. This is carried out such that the goods which are accessible from the door opening 4 are lifted out of the cargo space 2, whereafter goods located farther in the cargo space are transported towards and into the vicinity of the door opening 4 such that, also, the latter goods can be unloaded from the cargo space 2. This can continue until the cargo space 2 is empty.

An embodiment is shown in the drawings, wherein the transport device 5 is put together into three groups A, B and C with three parts in each group. Each part in the transport device 5 includes an endless conveyor belt 6 on which the goods can be placed for transport in the cargo space 2. The transport device 5 further includes a driving device 7 for moving the conveyor belt 6 and the goods 3 located thereon in the cargo space 2. According to certain embodiments of the present invention, the conveyor belt 6 is finally stressed after the frame structure is inserted into the cargo space 2.

Each transport device 5 includes a frame structure 8 on which the conveyor belt 6 and driving device 7 are provided. The frame structure 8 further includes a separating means 9, which consists of one or more plates located close to each other and which is provided between an upper part 6a and a lower part 6b of the conveyor belt 6. The frame structure 8 is, by means of retaining devices 10, attached to brackets 11 which, in turn, are provided in the cargo space 2 attached to the fuselage. These brackets 11 are preferably of the type which are already mounted in the cargo space 2 and which are adapted for fixing (e.g. straps for tying goods 3). The frame structure 8 is designed and can be located in the cargo space 2 in such manner relative to the brackets 11 that it can be attached thereto by means of the retaining devices 10.

Hereby, the transport device 5 can be placed as a completely or substantially completely finished unit in a suitable position relative to the brackets 11 and be quickly connected thereto. The unit can be completely or, to a substantial extent, pre-assembled inside or outside the cargo space 2, preferably in mounting premises adapted therefore and which are spacious and where the required parts for its assembly and the tools required therefore are easily accessible.

If the transport device 5 shall be assembled to a completely or substantially completely finished unit outside the cargo space 2, the frame structure 8 is preferably designed such that it can be brought into the cargo space 2 through the door opening 4. Hereby, the frame structure 8 may preferably include the conveyor belt 6 as well as the driving device 7 for its operation.

The frame structure 8 may be foldable to a smaller length and it can be brought into the cargo space 2 through the door opening 4 in this folded condition. Then, the frame structure 8 can be unfolded to its full length before it is fastened to the brackets 11.

The conveyor belt 6 can be provided pre-stressed on the frame structure 8 before the frame structure is brought into the cargo space 2 and it can be fully pre-stressed after having brought the frame structure 8 into the cargo space 2.

Figure 3:
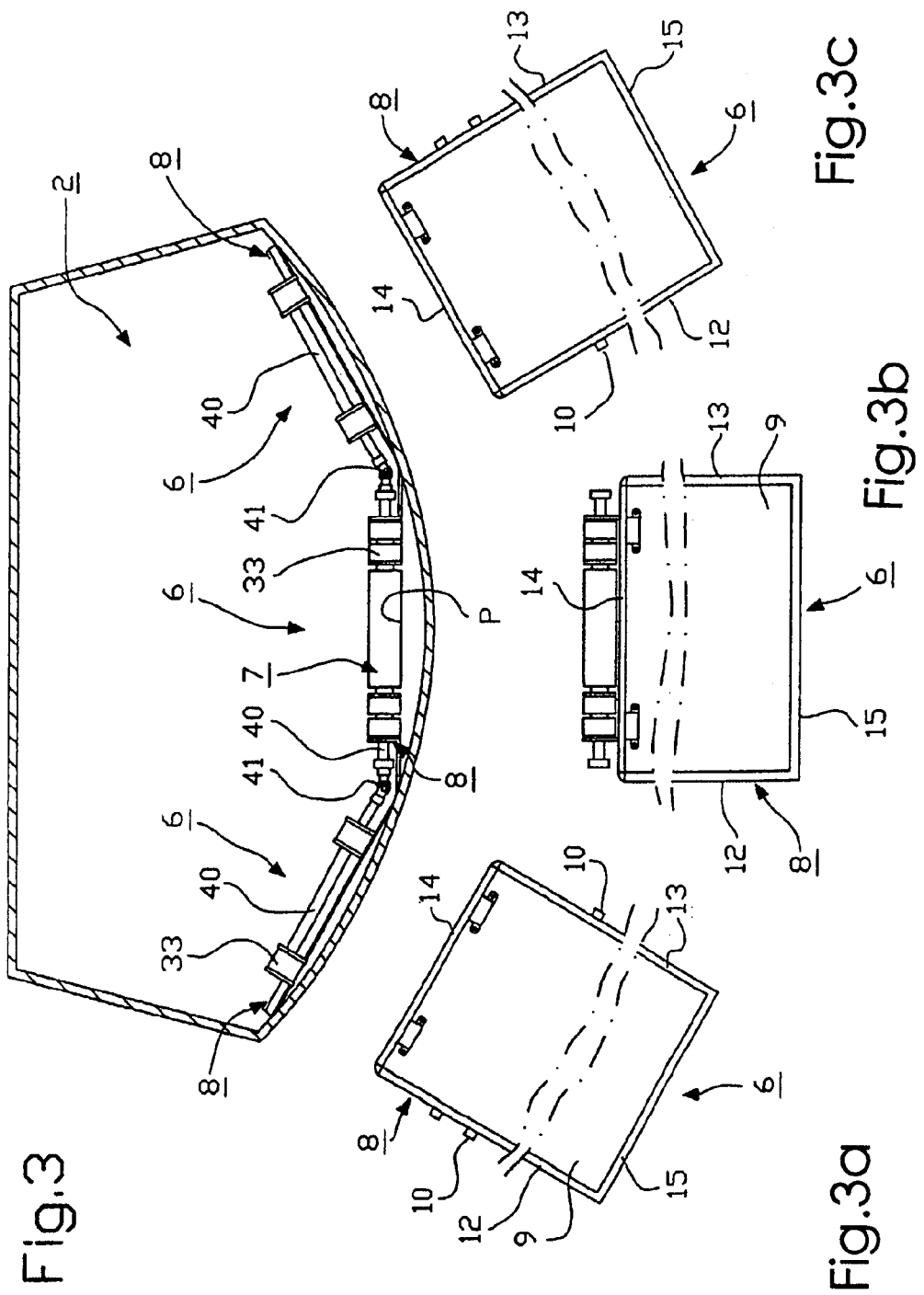
Figure 4:
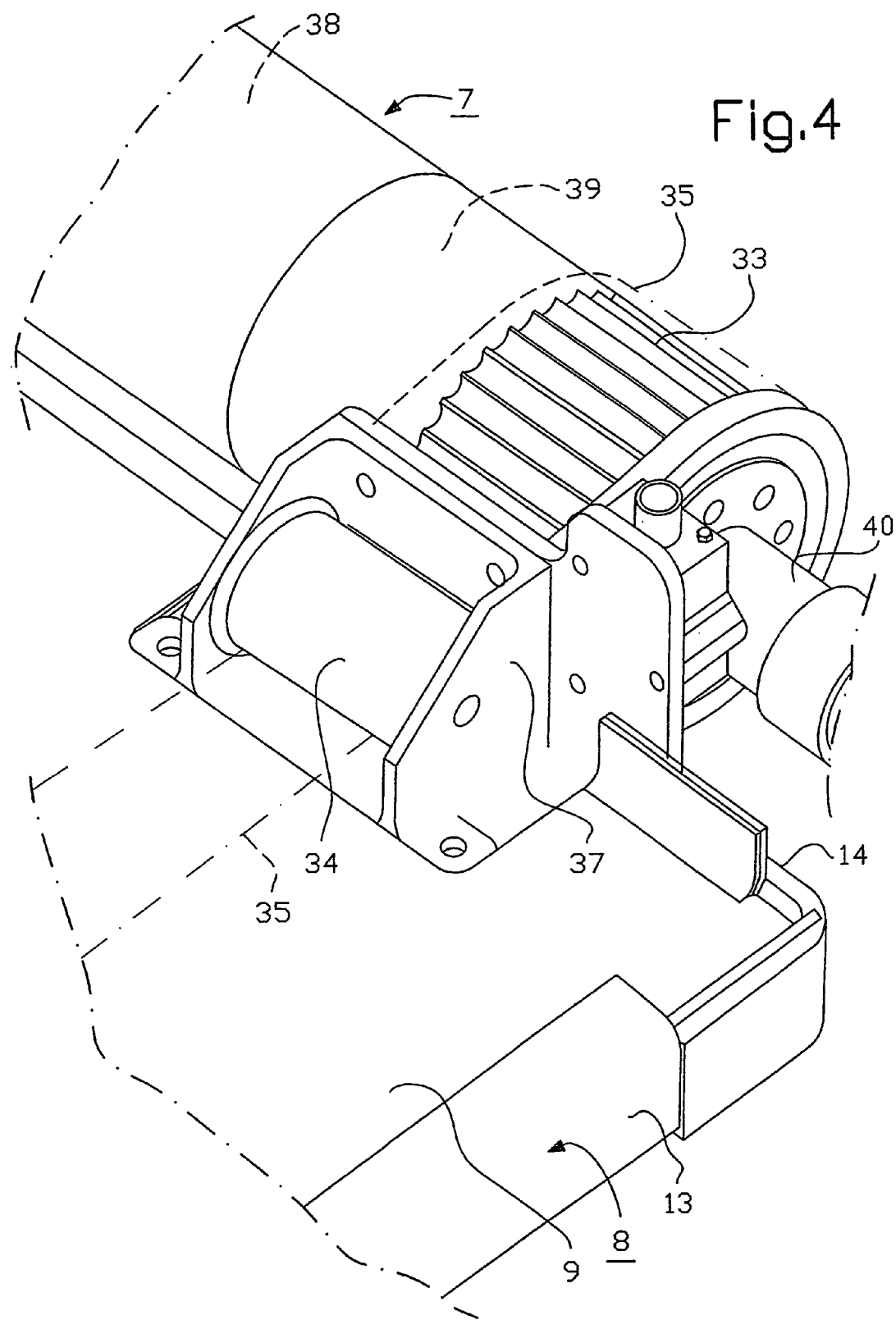
FIG. 4 is a perspective view of a rear part of the transport device according to the invention.

The frame structure 8 may be designed in various ways. In the embodiment shown, the frame structure 8 is elongated and includes two longitudinal frame profiles 12 and 13 which at the rear are connected to each other by means of a transverse rear frame profile 14 (see FIGS. 3a-3c) and at the front are connected by means of a transverse front frame portion 15. The driving device 7 is mounted on the rear frame profile 14 and located behind the profile. On the front frame profile 15 there is provided at least one roll 16 or a similar means which is located in front of the profile. The conveyor belt 6 extends along the frame structure 8 (i.e. along its longitudinal frame profiles 12, 13) and cooperates with the driving device 7 at which it, at the rear, transforms or passes from its upper part 6a to its lower part 6b. The conveyor belt 6 also cooperates with the roll 16, at which it at the front transforms or passes from its upper part 6a to its lower part 6b.

The rear and front frame profiles 14, 15 preferably engage the separating means 9, which preferably is a rigid plate-like means and which is fixedly connected to the profiles. Thus, the rear and front frame profiles 14, 15 may have a four side cross section and be located in elongated grooves 17, 18 at the back and at the front in the plate-like means 9. The shape of these grooves 17, 18 can be adapted to the shape of the frame profiles 14, 15 and the walls or sides of the grooves 17, 18 can engage the walls or sides of the frame profiles and be connected thereto, preferably by sizing, such that the plate-like means 9 and the frame profiles 14, 15 are fixedly connected or attached to each other.

The grooves 17, 18 in the plate-like means 9 can be defined by a lower and an upper layer 19, 20 and by inner parts 21 of the plate-like means 9 located between the layers.

The plate-like means 9 can be sandwich-shaped since its lower and upper layers 19, 20 and inner parts 21 are located at each other. The inner parts 21 can be honeycomb shaped and consist of KEVLAR or aluminium and the lower and upper layers 19, 20 can be made of a carbon fiber material.

The rear and/or front frame profile 14, 15 preferably has/have a body of a metallic material, preferably aluminium, and this body is surrounded by a carbon fiber material which preferably is wound around the body.

Each longitudinal frame profile 12, 13 preferably includes an outer rail 22 having a substantially C-shaped cross section and consisting of a suitable light weight material (e.g. aluminium). Upper parts 22a of the rail 22 can extend in over longitudinal edge portions of the upper part 6a of the conveyor belt 6 and lower parts 22b of the rail 22 can extend in under longitudinal edge portions of the lower part 6b of the conveyor belt 6.

The retaining devices 10 are provided to retain the frame structure 8 at the fuselage such that the frame structure can move in the retaining devices 10 when it is subjected to abnormal loads. The retaining devices 10 preferably also permit distribution or spreading of the forces affecting the frame structure 8 to a plurality of such locations on the fuselage which are provided one after the other along the frame structure 8 in the longitudinal direction thereof.

The retaining devices 10 may have different designs and they may be directly attached to the brackets 11 or indirectly by means of anchoring means 25 of a suitable type. Furthermore, the retaining devices 10 can be provided at several locations (e.g. three locations), distributed along each of the longitudinal frame profiles 12, 13 of the frame structure (i.e. the frame structure 8 can be fixed at six locations).

The retaining devices 10 are provided to permit that, if the frame structure 8 subjects any of the devices to abnormally high loads, the frame structure 8 can move in the retaining device or devices 10 relative to other retaining devices 10, such that the abnormally high loads can be taken up by several retaining devices 10, particularly if the conveyor belt 6 is loaded with goods 3 and if a separating device 48, separating the conveyor belt 6 in a front part 6c and a rear part 6d, by the movement of the conveyor belt, is brought to an intermediate position between a front end portion 5a and a rear end portion 5b of the transport device 5.

The retaining devices 10 are preferably also provided to permit movement of the frame structure 8 relative to such a retaining device or such retaining devices 10 which can not take up abnormal high loads which are applied thereon by the frame structure 8.

The retaining devices 10 are preferably provided to permit movement of the frame structure 8 in a plane which is parallel or substantially parallel with the transport and storing plane (P) of the conveyor belt 6.

The retaining devices 10 are also preferably provided to permit movement of the frame structure 8 in parallel or substantially in parallel with the transport direction T of the conveyor belt 6.

If the frame structure 8 twists or tends to twist in any of the retaining devices 10, the devices can be provided to permit transfer and braking of this twisting movement by other retaining devices 10.

Each retaining device 10 may include an elongated flexible means 27 which is located between the frame structure 8 and the fuselage and which permits movement of the frame structure 8 relative thereto. If a retaining device 10 is loaded by the frame structure 8 relative to the fuselage with abnormally high loads, the elongated flexible means 27 can slide relative to the fuselage. The elongated flexible means 27 can, by means of tightening devices 28a, 28b, 29, be connected to the frame structure 8 on opposite sides of the anchoring means 25. Parts of the elongated flexible means 27 are provided to be able to move in lateral directions relative to the transport direction T of the conveyor belt 6 if the elongated flexible means 27 is subjected to abnormal high loads in the lateral directions.

The retaining device 10 may include at least one lower and one upper tightening element 30, 31 and at least one tightening device 32. The lower tightening element 30 may cooperate with the fuselage and the elongated flexible means 27 with the frame structure 8. The elongated flexible means 27 can grasp in between the lower and upper tightening elements 30,31 and the tightening device 32 can be provided to tighten the lower and upper tightening elements 30,31 against the elongated flexible means 27 with such a force that if the frame structure 8 is loaded with abnormal high forces relative to the fuselage, the elongated means 27 can slide relative to the lower and upper tightening elements 30,31 by overcoming the tightening forces thereof.

The elongated flexible means 27 is preferably provided in parallel or substantially in parallel with the transport direction T of the conveyor belt 6 and the elongated flexible means 27 can be a wire or similar (e.g., made of steel).

Figure 9:
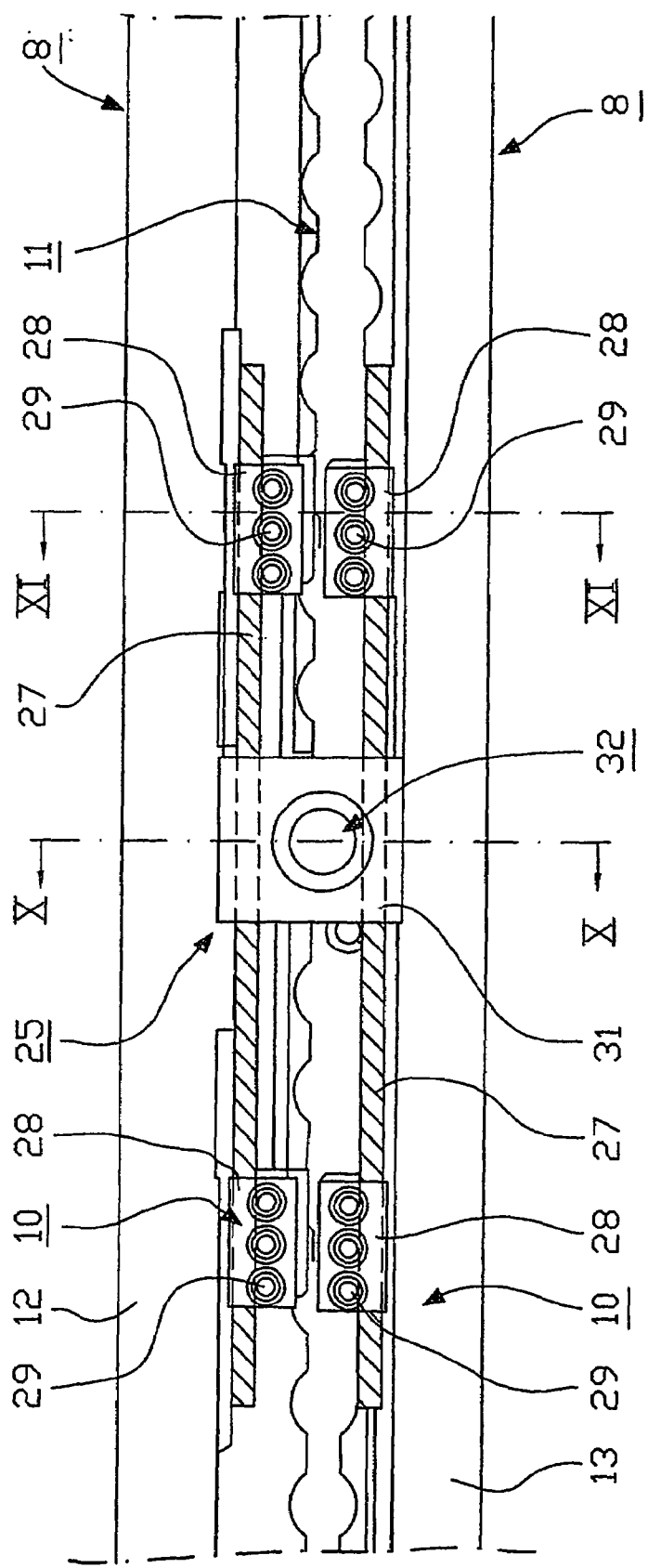
FIG. 9 is a plan view of a part of the transport device according to the invention.
Figure 10:
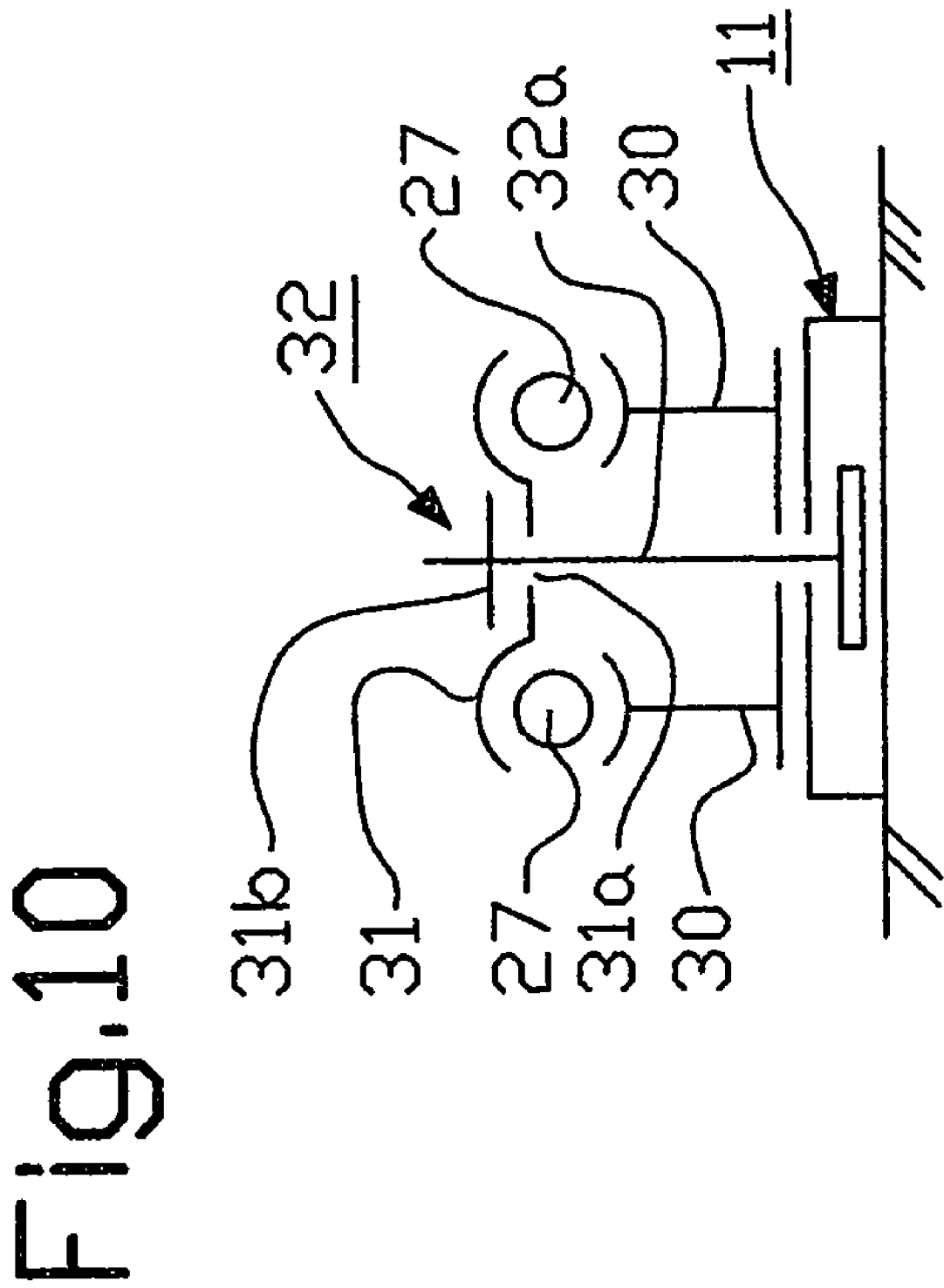
FIG. 10 is a section X-X through the part of FIG. 9.
Figure 11:
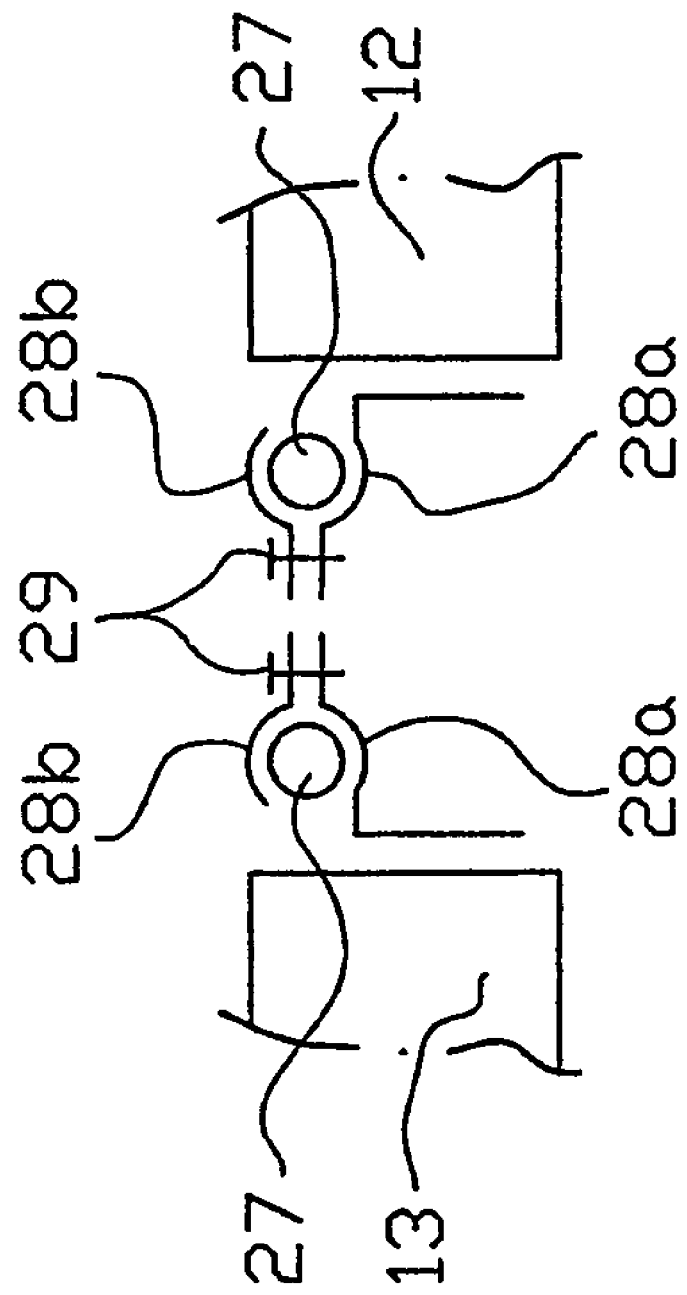
FIG. 11 is a section XI-XI through the part of FIG. 9.
Figure 12:
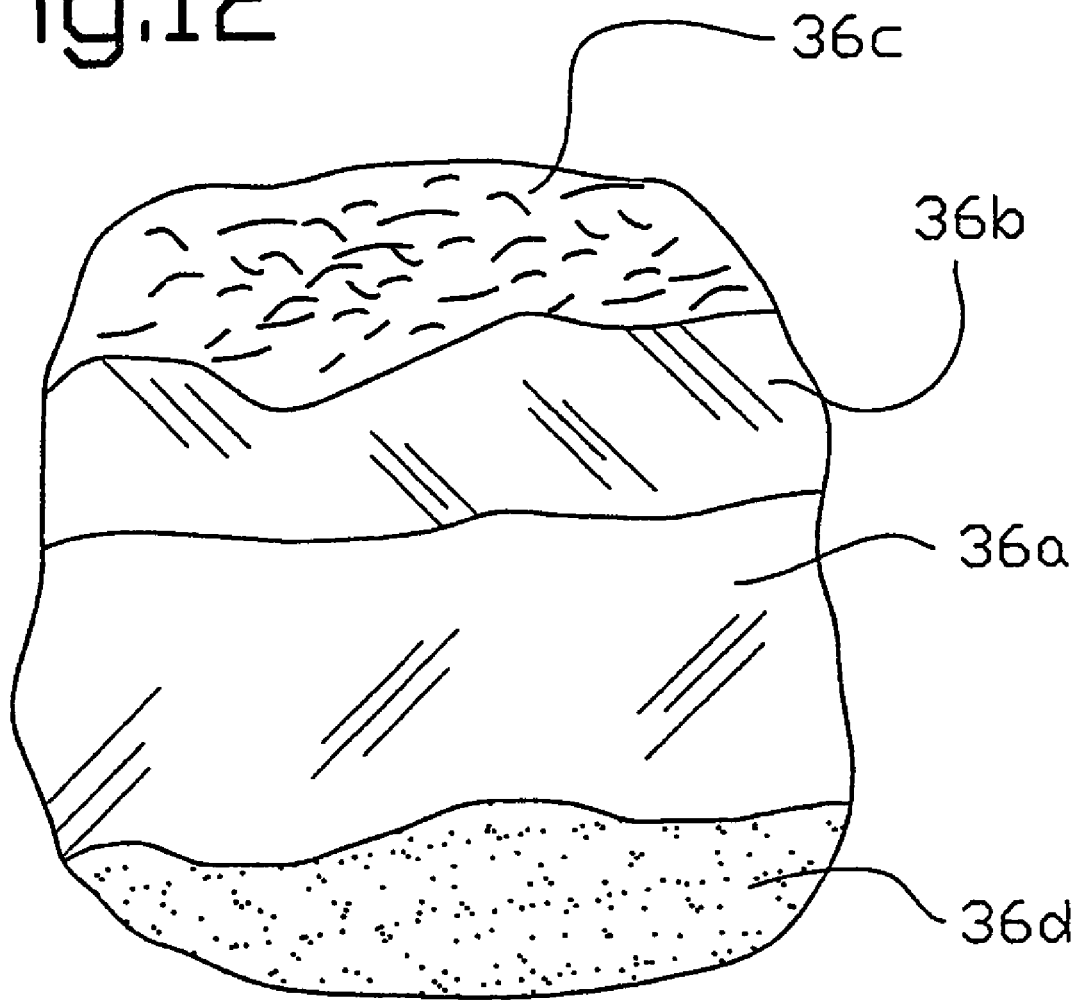
FIG. 12 is a plan view of a transport mat forming part of the transport device according to the invention.

As is apparent from FIGS. 9, 10 and 11, each retaining device 10 may include two elongated flexible means 27 which are provided in parallel or substantially in parallel with each other. One lower tightening element 30 can be provided for each elongated flexible means 27 and an upper tightening element 31 can be provided for both elongated flexible means 27. The tightening device 32 may include a tightening screw 32a which cooperates with brackets 11 on the fuselage by grasping into and protrude therefrom. The tightening screw 32a can protrude between the lower tightening elements 30 which can engage the brackets 11. The tightening screw 32a can also protrude through a hole 31a in the upper tightening element 31 and above the element have a tightening nut 31b, allowing tightening of the upper tightening element 31 in a direction towards the bracket 11 and thereby pressing the lower tightening element 30 against the bracket 11.

The elongated flexible means 27 can be connected to the frame structure 8 by a lower tightening element 28*a* provided on the frame structure, an upper tightening element 28*b* and a tightening screw 29. The lower and upper tightening elements 28*a*, 28*b* can be tightened together around the elongated flexible means 27 and the lower and upper tightening elements 28*a*, 28*b* can eventually be provided to slide along the elongated flexible means 27.

If two frame structures 8 are located beside each other, each elongated flexible means 27 can be mounted on the respective frame structure 8 by means of a first lower and upper tightening element 28*a*, 28*b* and a tightening screw 29 cooperating with an elongated flexible means 27 which cooperates with a frame structure 8.

The driving device 7 may have at least two drive gears 33 on each frame structure 8, but at outer frame structures 8 it may be sufficient with one driving gear 33. The gears 33 are provided substantially level with the plate-like means 9 of the frame structure 8 such that lower parts thereof are found substantially in a first level with the underside of the plate-like means 9 of the frame structure 8 or somewhat below the level. On each frame structure 8, close to each drive gear 33, there is provided a roll 34 which is located such that lower parts thereof are found substantially in a second level with the upper side of the plate-like means 9 of the frame structure 8. The lower part 6*b* of the conveyor belt 6 extends at the first level from the lower parts of the drive gears 33 and in under the plate-like means 9 and the upper part 6*a* of the conveyor belt 6 extends from the drive gears 33 and in under the roll 34 and after the lower parts thereof on the second level along the upper side of the plate-like means 9.

The drive gears 33 may have teeth and the conveyor belt 6 toothed transport belts 35 which cooperate with the drive gears 33. The conveyor belt 6 may further include a transport mat 36 at which the transport belts 35 are provided.

The drive gears 33 are most suitably located right behind mounting means 37 through which the driving device 7 is provided on the frame structure 8 and each mounting means 37 may include a roll 34.

At the illustrated embodiment, the intermediate transport device 5 has one or more driving motors 38 and one or more switch devices 39 and shafts 40 on which the drive gears 33 are mounted. These shafts 40 are through universal or cardan devices 41 or similar connected to corresponding shafts 40 with corresponding drive gears 33 on the two outer transport devices 5 such that the drive or working power of the driving motors 38 is transferred to the drive gears 33 of the intermediate as well as the outer transport devices 5.

Figure 5:
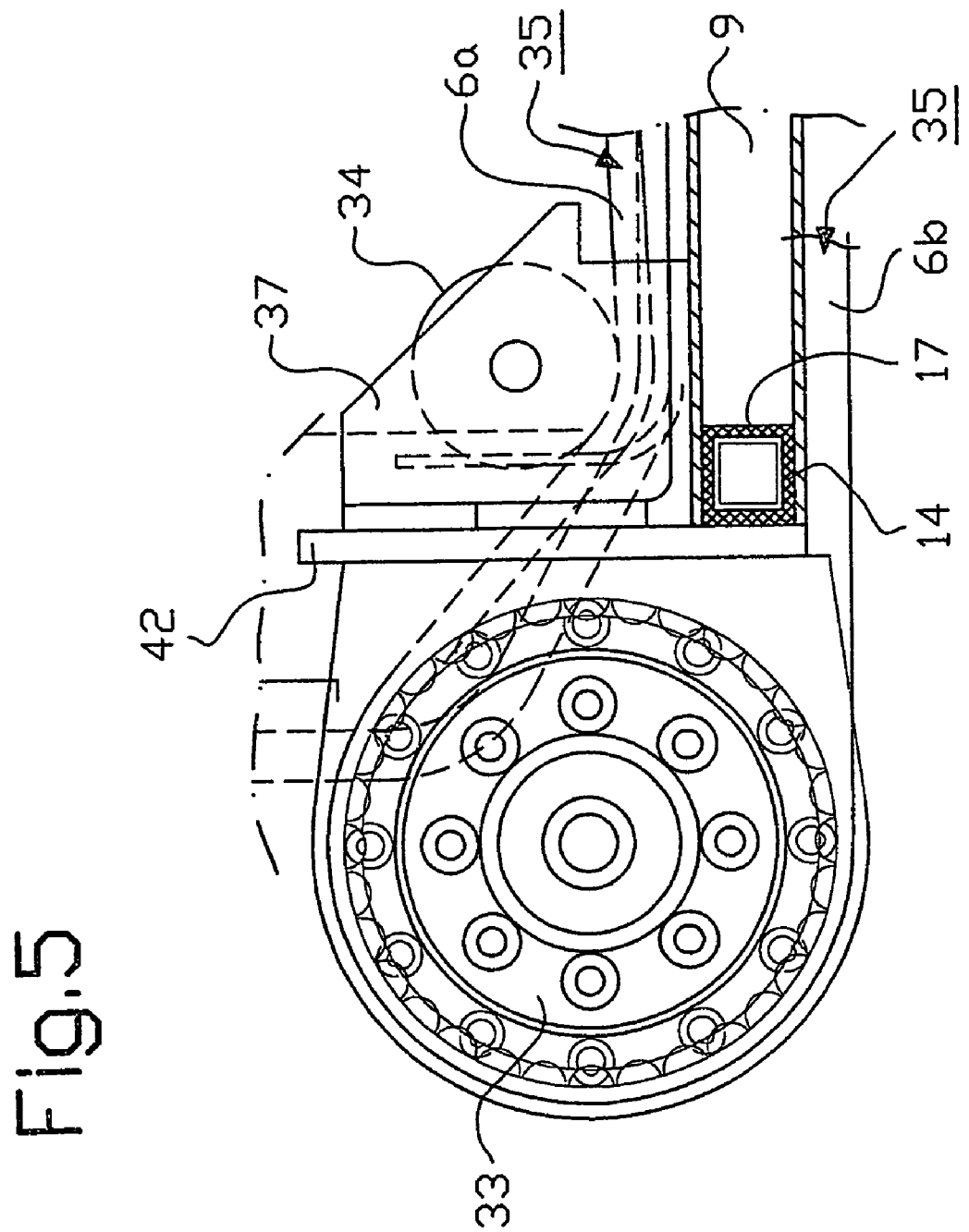
FIG. 5 is a section V-V through a rear part of the transport device of FIG. 2.
Figure 6:
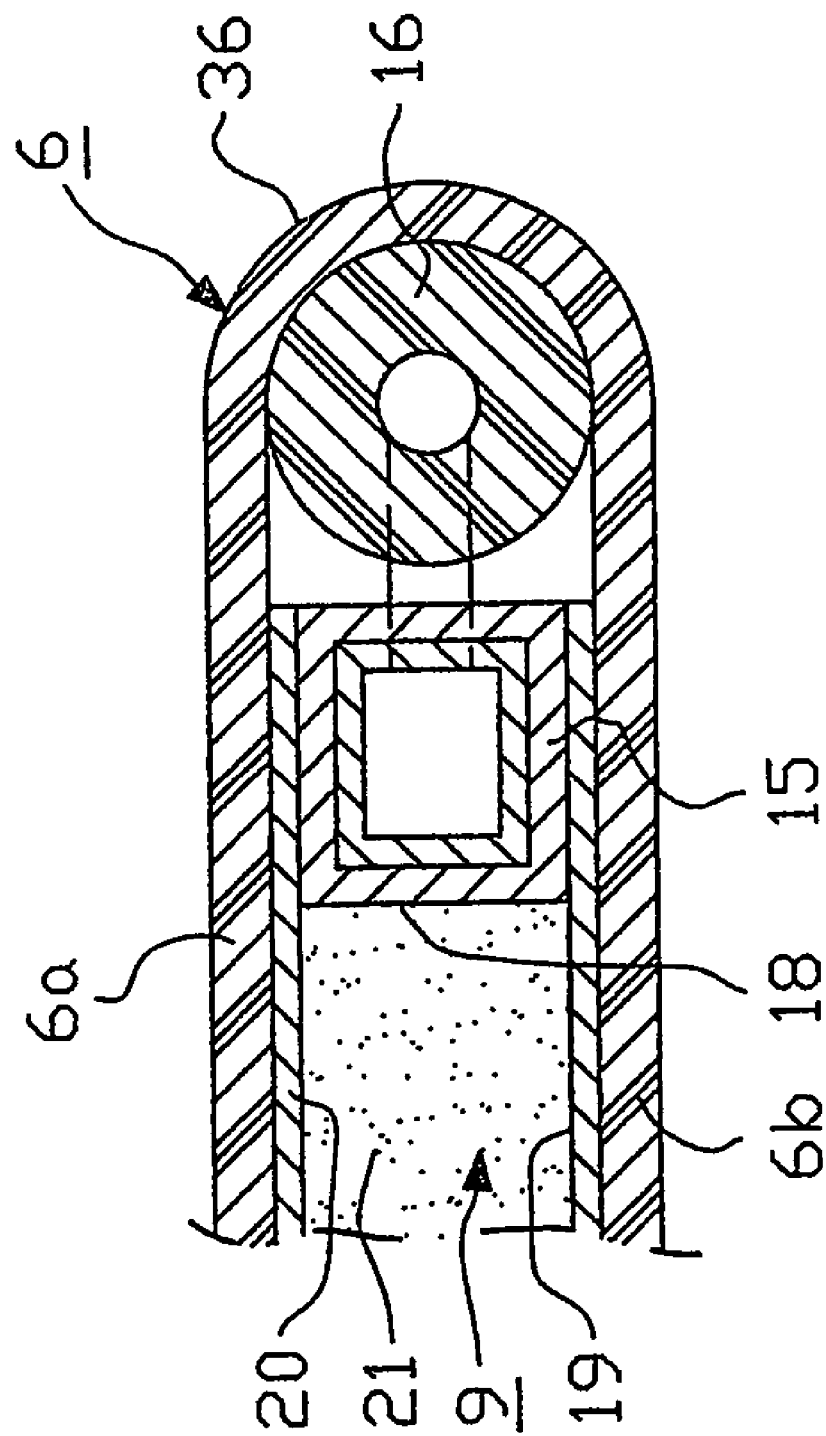
FIG. 6 is a section VI-VI through a front part of the transport device of FIG. 2.
Figure 7:
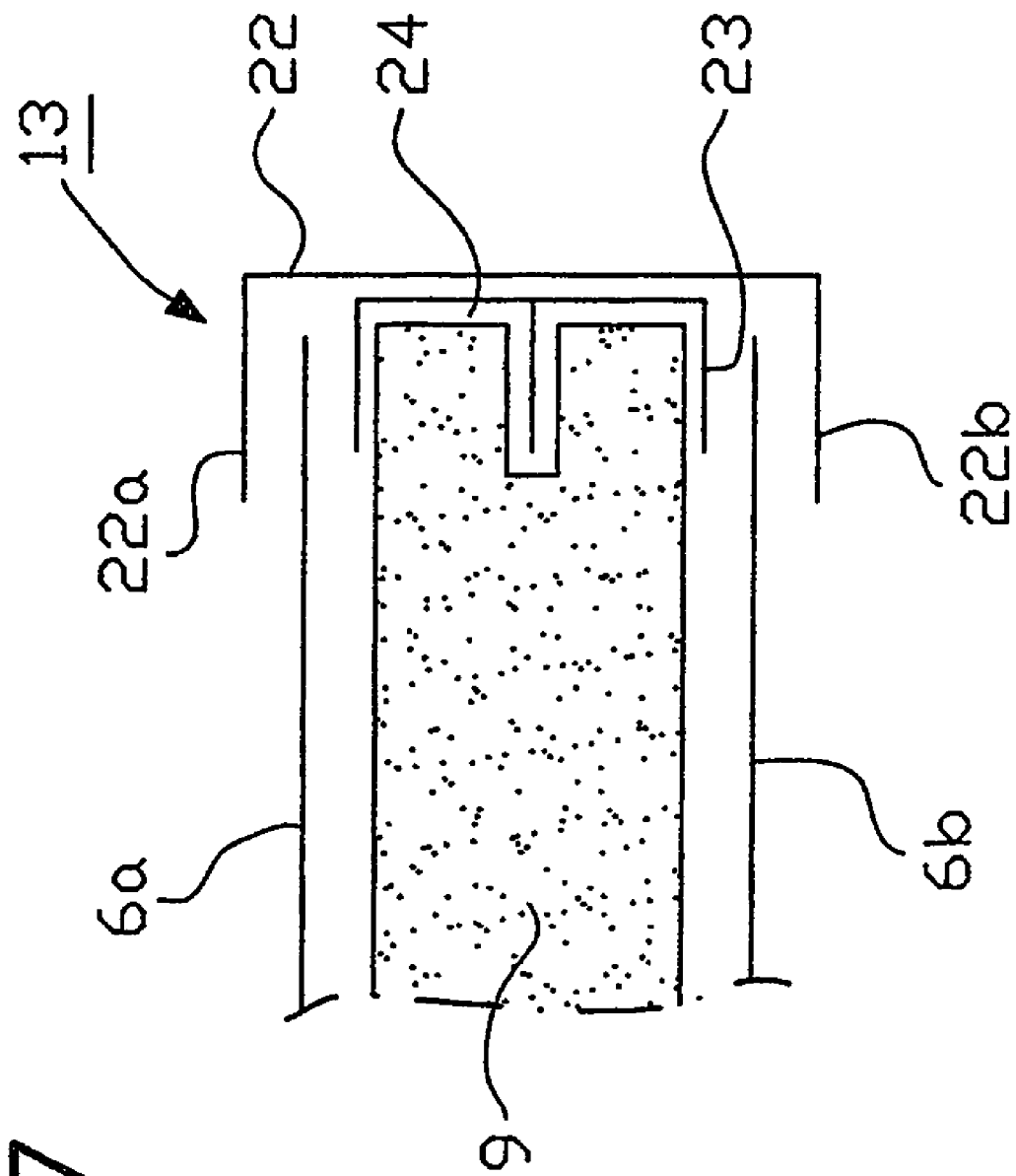
FIG. 7 is a section VII-VII through a part of the transport device of FIG. 2.

First positioning and retaining means 42 (see FIG. 5) may be provided on suitable locations at the back of the frame structures 8 or at such parts which are located at the back of the frame structures 8 in order to ensure or facilitate setting and retention of the frame structures 8 in predetermined mutual positions relative to each other in their longitudinal directions. Hereby, the frame structures 8 can, inter alia, be located such that the shafts 40 attain correct positions relative to each other and can be easily interconnected by means of the cardan devices 41.

Figure 8:
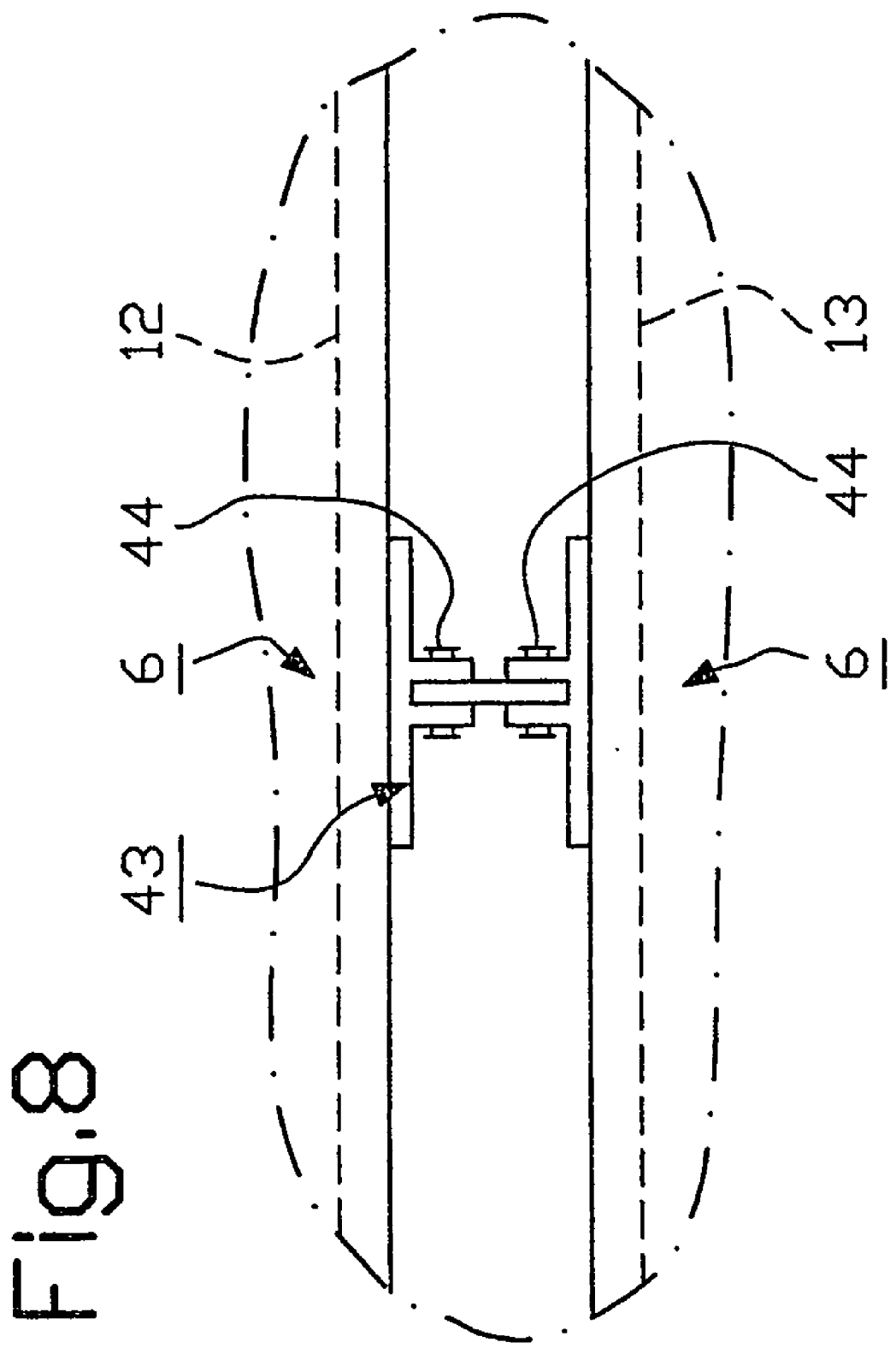
FIG. 8 is a section VIII-VIII through a part of the transport device of FIG. 2.

Other positioning and retaining means 43 (see FIG. 8) can be provided between the frame structures in order to ensure and facilitate setting and retention of the frame structures 8 at predetermined distances from each other. The latter positioning and retaining means 43 can, through one or more in relation to the frame structures longitudinal flexible axes 44, be articulately connected to each other such that there is a certain flexibility between the frame structures 8.

Figure 2:
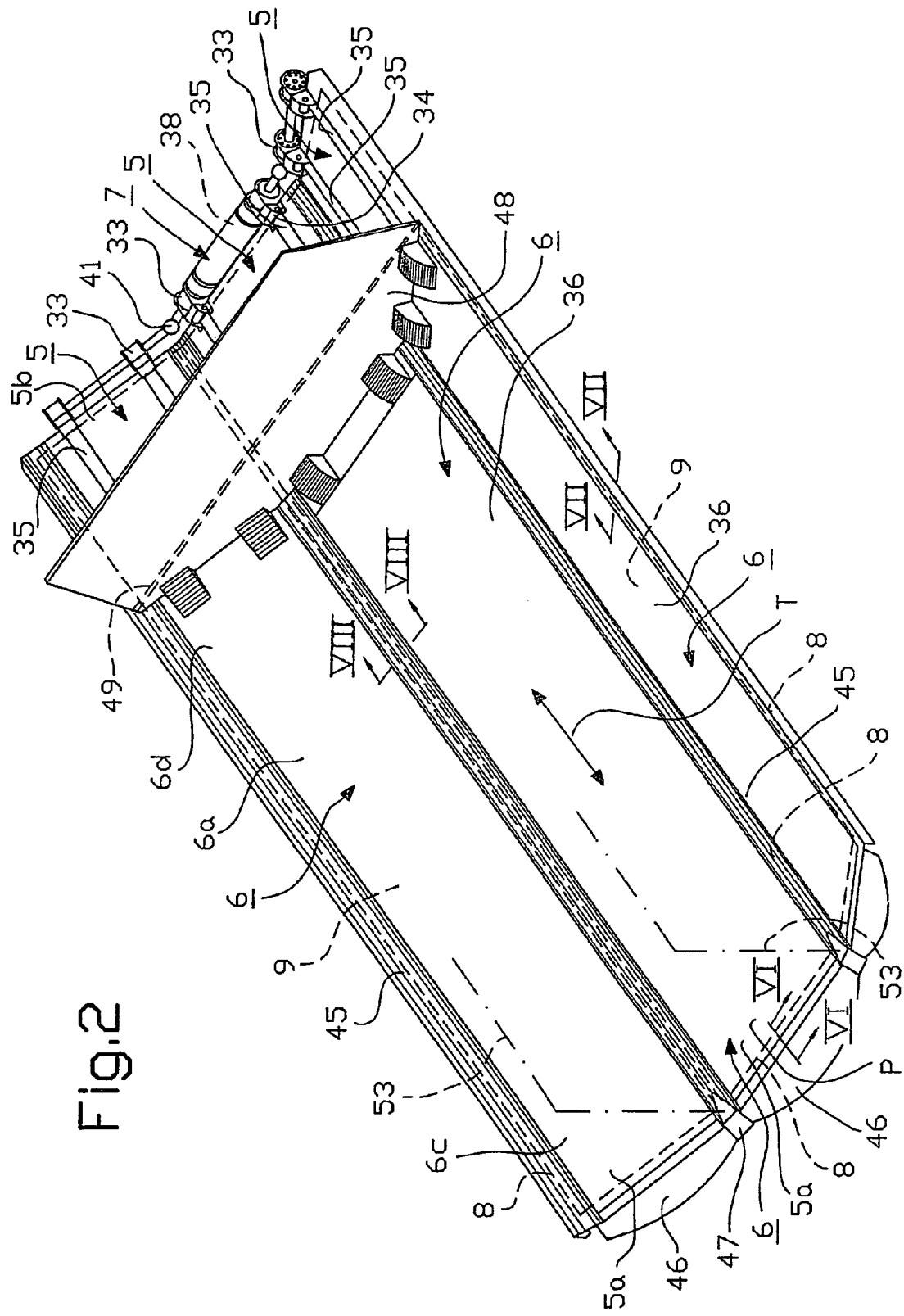
FIG. 2 is a perspective view of a transport device according to the invention.

At least one first cover means 45 (see FIG. 2) can be provided between two adjacent frame structures 8 for covering longitudinal gaps therebetween and each cover means 45 can be attached to the longitudinal frame profiles 12, 13 of two adjacent frame structures 8. At least one second cover means 46 (see FIG. 2) can be provided in front of each conveyor belt 6 for covering the belt from the front. At least one third cover means 47 is provided in front of a gap between two conveyor belts 6 for covering the gap between the belts 6.

The separating device 48 may be a wall 48 (see FIG. 2) extending in transverse direction relative to the conveyor belts 6 of the frame structures 8, the wall eventually being common to the conveyor belts 6 of all three frame structures 8 and being located at the back of the upper parts 6*a* of the conveyor belts 6 where the transport mats 36 and transport belts 35 are provided at each other. The transverse wall 48 is connected to all three conveyor belts 6 such that it is brought along therewith during their transport movement.

At least one transverse support beam 49 for supporting the transverse wall 48 is connected to and extends from one outer conveyor belt 6 to the other outer conveyor belt 6. The support beam 49 is most suitably located a distance above the conveyor belt 6 of the intermediate frame structure 8.

The transport mat 36 may have a net structure with fiber threads running in and transverse to the transport direction of the transport mat 36, the fiber threads being provided and/or designed such that the transport mat 36 is considerably more rigid in transverse than in longitudinal direction relative to its transport direction. If all fiber threads consist of, for example, KEVLAR, the transverse fiber threads may be thicker than the longitudinal fiber threads.

The transverse fiber threads of the transport mat 36 may consist of carbon or glass fibers in carbon and glass fiber layers 36*b* and the longitudinal fiber threads are made of KEVLAR material and form part of the upper carbon and glass fiber layer 36*a*, which above the longitudinal fiber threads of KEVLAR material consists of fiber threads of KEVLAR running crosswise relative to each other and at about 45 relative to the transport direction.

The transport mat 36 may in section be of sandwich type and have the upper layer 36*a* of fiber threads made of KEVLAR material, the intermediate layer 36*b* under the upper layer made of carbon or glass fiber threads and a lower layer 36*c* made of a soft material (e.g. a textile material) through which the transport mat 36 is adapted to engage the plate-like means 9 forming part of the frame structure 8. The upper layer 36*a* may be covered by a protective layer 36*d* of rubber material.

Figure 13:
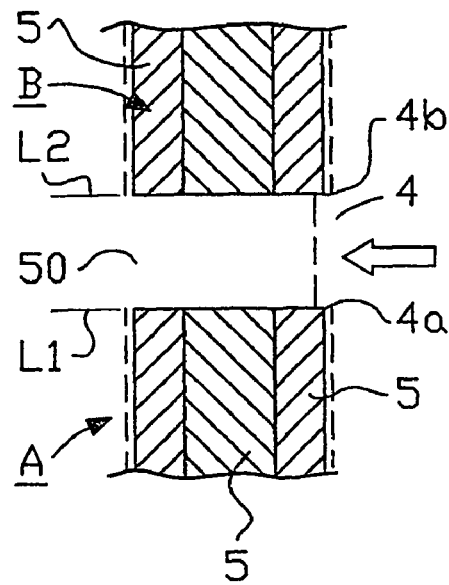
FIGS. 13-15 illustrate with schematic plan views different ways to locate transport devices relative to a door opening in the aircraft.

As is shown in FIG. 13, front parts of transport devices 5 in a first group A located beside each other can be provided or substantially provided on a line L1 extending straight into the cargo space 2 from a first side edge 4*a* of a door opening 4 through which goods 3 can be loaded into and unloaded from the cargo space 2.

As is further apparent from FIG. 13, there may be provided in the cargo space 2, except for the first group A, a second group B consisting of three transport devices 5.

The three transport devices 5 of the second group B may be provided or substantially provided on a line L2 extending straight into the cargo space 2 from a second side edge 4*b* of the door opening 4. Between the transport devices 5 of the two groups A and B there is a free space 50 within the door opening 4, in which personnel eventually may stand during loading and unloading of goods or cargo 3.

Figure 14:
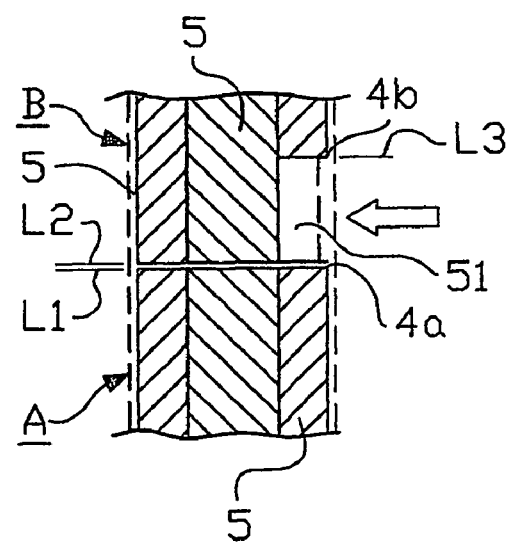

As is shown in FIG. 14, front parts of two transport devices 5 of the second group B, located farthest away from the door opening 4, may be provided on a line L2 close to the line L1 on which front parts of the transport devices 5 of the first group A are provided.

Front parts of the third transport device 5 of the second group B, located closest to the door opening 4, are however provided on a line L3 extending straight into the cargo space 2 from the other side edge 4b of the door opening 4, such that a free space 51 is defined within the door opening 4, which is as deep as the third transport device 5 is wide. This space 51 may be open down below when the door opening 4 is open.

Figure 15:
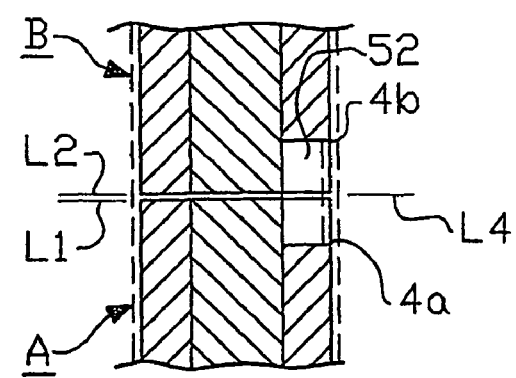

As is apparent from FIG. 15, front parts of two transport devices 5 of each group A and B, located farthest away from the door opening 4, may be provided on lines or substantially on lines L1, L2 close to a line L4 extending straight into the cargo space 2 from the center or substantially the center of the door opening 4. The front parts of two transport devices 5 of each group A and B, located closest to the door opening 4, may however be provided at opposite side edges 4a, 4b of the door opening 4, such that a frame free space 52 is defined within the door opening 4, which is as deep or substantially as deep as the width of the transport devices 5 located closest to the door opening 4 and which is situated outside front side edges of inner transport devices 5 of the two groups A and B. The space 52 may be open down below when the door opening 4 is open.

Eventually, longitudinal partition walls 53 may be provided between the transport devices 5 (the walls are indicated with broken lines in FIG. 2) in order to define three separate cargo spaces, namely one cargo space for each conveyor belt 6.

The invention is not limited to the abovementioned constructions or methods, but may vary within the scope of the subsequent claims.

Thus, it should be mentioned that the frame structures 8, the driving device 7, the plate-like means 9 and the retaining devices 10 can be designed otherwise than described above. The conveyor belt 6 does not need to consist of a transport mat 36 and transport belts 35, but may consist of only one endless transport mat 36 without transport belts. The anchoring means 25 and other members forming part of the transport device or transport devices 5 may also vary in shape and function without departing from the idea of the invention.

The invention claimed is:

1. A transport system including a transport device in cargo spaces in aircrafts,
   said transport device comprising a first frame structure which by means of retaining devices is provided at the fuselage in the cargo space,
   wherein the first frame structure includes at least one conveyor belt for transport and storage of goods in the cargo space,
   characterized in that the retaining devices are provided to retain the first frame structure at the fuselage such that the first frame structure can move in said retaining devices when the first frame structure is subjected to abnormally high loads in order to prevent damage on the aircraft body, and wherein each retaining device includes at least one elongated flexible means which is located between the first frame structure and the fuselage and which permits movement of the first frame structure relative thereto, characterized in that said at least one flexible means is provided in parallel or substantially in parallel with the transport direction of the conveyor belt.

2. The transport device system according to claim 1, characterized in that the retaining devices permit distribution of forces affecting the first frame structure to a plurality of locations on the fuselage situated after each other along the longitudinal direction of the first frame structure.

3. The transport system according to claim 1, characterized in that the retaining devices are provided to permit, if the first frame structure subjects any of said retaining devices to abnormally high loads, movement of the first frame structure in this or these retaining devices relative to other retaining devices such that said abnormally high loads can be taken up by several retaining devices.

4. The transport system according to claim 1, characterized in that the retaining devices are provided to permit movement of the first frame structure relative to that or those retaining devices which is/are not capable of taking up abnormally high loads which are subjected thereto or applied thereon by the first frame structure.

5. The transport system according to claim 1, characterized in that the retaining devices are provided to permit movement of the frame structure relative to that or those retaining devices which is/are not capable of taking up abnormally high loads which are applied thereon by the first frame structure when the conveyor belt is loaded with goods.

6. The transport system according to claim 5,
   wherein the transport device has a front end portion through which goods are loaded onto and unloaded from a conveyor belt and a rear end portion opposed to the front end portion,
   wherein the conveyor belt has a separating device separating said belt in a front part on which goods can be placed and a rear part closest to the rear end portion of the transport device,
   wherein the separating device moves with the conveyor belt between the front and rear end portions of the transport device, and
   wherein the conveyor belt can be set such that the separating device is situated in an intermediate position between the front and rear end portions of the transport device, characterized in
   that the retaining devices are provided to permit movement of the first frame structure relative to that or those retaining devices which is/are not capable of taking up abnormally high loads applied thereon by the first frame structure when the conveyor belt is loaded with goods and when the separating device is set in an intermediate position between the front and rear end portions of the transport device.

7. The transport system according to claim 1, characterized in that the retaining devices are provided to permit movement of the first frame structure in a plane that is parallel or substantially parallel with the transport and storing plane of the conveyor belt.

8. The transport system according to claim 1, characterized in that the retaining devices are provided to permit movement of the first frame structure in parallel or substantially in parallel with the transport direction of the conveyor belt.

9. The transport system according to claim 1, characterized in that if the first frame structure twists or tends to twist in any of the retaining devices, said devices are provided to permit transfer and braking of this twisting movement by other retaining devices.

10. The transport system according to claim 1, characterized in that the retaining devices are provided at a plurality of locations after each other in a longitudinal direction of the first frame structure and on opposite sides of said first frame structure.

11. The transport system according to claim 10, characterized in that the retaining devices are provided at three locations.

12. The transport system according to claim 1, characterized in that if a retaining device is loaded by the first frame structure relative to the fuselage with abnormal high loads, the elongated flexible means can slide relative to said fuselage.

13. The transport system according to claim 1, characterized in that said at least one elongated flexible means by means of tightening devices is connected to the first frame structure on opposite sides of anchoring means through which said at least one elongated flexible means is connected to the fuselage.

14. The transport system according to claim 1, characterized in that parts of said at least one elongated flexible means are provided to be able to move in lateral directions relative to the transport direction of the conveyor belt if said at least one elongated flexible means is subjected to abnormally high loads in said lateral directions.

15. The transport system according to claim 1, characterized in
that each retaining device includes at least one lower and one upper tightening element and at least one tightening device,
that the lower tightening element cooperates with the fuselage and said at least one elongated flexible means with the first frame structure,
that said at least one elongated flexible means grasps in between the lower and upper tightening elements, and
that the tightening device is provided to tighten the lower and upper tightening elements against said at least one elongated flexible means with such a force that if the first frame structure is loaded with abnormally high forces relative to the fuselage, said at least one elongated flexible means can slide relative to the lower and upper tightening elements by overcoming the tightening forces thereof.

16. The transport system according to claim 15, characterized in
that the tightening device includes a tightening screw which cooperates with brackets on the fuselage by grasping into and protruding therefrom,
that the tightening screw protrudes between said lower tightening element which engage said brackets, and
that the tightening screw protrudes through a hole in the upper tightening element and has above said element a tightening nut allowing tightening of the upper tightening element in a direction towards the bracket.

17. The transport system according to claim 1, characterized in that said at least one elongated flexible means is a wire.

18. The transport system according to claim 1, characterized in that the first frame structure is insertable into the cargo space through a door opening in the aircraft through which goods can be brought into and out of said aircraft.

19. The transport system according to claim 18, characterized in that the first frame structure along with a conveyor belt and transport device provided thereon is insertable into the cargo space through said door opening.

20. The transport system according to claim 18, characterized in
that the conveyor belt is provided pre-stressed on the first frame structure before said first frame structure is inserted into the cargo space through the door opening, and
that the conveyor belt is finally stressed after the first frame structure has been inserted into the cargo space through the door opening.

21. The transport system according to claim 18, characterized in
that the first frame structure is foldable to a least length,
that the first frame structure in folded condition is insertable through the door opening and into the cargo space, and
that the first frame structure can be unfolded to its full length after its insertion in folded condition into the cargo space and before it is attached to brackets.

22. The transport system according to claim 1, characterized in
that a driving device for driving or operating the conveyor belt has at least two drive gears which are provided substantially in level with separating means of the first frame structure such that lower parts thereof are found substantially in a first level with the underside of said separating means of the first frame structure or somewhat below said level,
that on the first frame structure, adjacent to each drive gear, there is provided a roll which is located such that lower parts thereof are found substantially in a second level with the upper side of the separating means of the first frame structure,
that a lower part of the convey or belt extends at the first level from the lower parts of the drive gears and in under the separating means, and
that an upper part of the conveyor belt extends from the drive gears and in under the roll and after the lower parts thereof on the second level along the upper side of the separating means.

23. The transport system according to claim 22, characterized in
that the drive gears have teeth,
that the conveyor belt has toothed transport belts which cooperate with the drive gears, and
that the conveyor belt further comprises a transport mat on which the transport belts are provided.

24. The transport system according to claim 22, characterized in
that the driving device has the at least two drive gears with which transport belts forming part of the conveyor belt cooperate,
that the drive gears are proved right behind and on mounting means through which the driving device is provided on the first frame structure, and
that rolls are provided in front of the drive gears, an upper part of the transport belts running under said rolls from the drive gears of the driving device to a transport mat forming part of the conveyor belt at which said transport belts are provided, whereby said rolls are mounted on the mounting means.

25. The transport system according to claim 22, characterized in that the driving device on one of at least three transport elements located beside each other comprises on the intermediate transport elements at least one driving motor, the drive or working power of which is transferred to drive gears on the intermediate transport element as well as on the other transport elements.

26. The transport system according to claim 22, characterized in
that the first frame structure is elongated and includes two longitudinal frame profiles which at the back are connected to each other by means of a transverse rear frame profile and at the front by means of a transverse front frame profile, that the driving device is provided on the transverse rear frame profile, that at least one roll is provided on the transverse front frame profile, and that the conveyor belt at the back cooperates with the driving device and at the front with the roll and transforms or changes from its upper part into its lower part at these locations.

27. The transport system according to claim 26, characterized in that the rear frame profile is provided in an elongated groove at the back in the separating means which is designed as at least one plate-like means, that the front frame profile is provided in a groove at the front in the separating means, and that the separating means is connected to the rear and front frame profiles while the walls of the grooves engage and are connected to the walls of the frame profiles.

28. The transport system according to claim 27, characterized in that the rear and front frame profiles have a four side cross section and engage a lower and an upper layer of the separating means as well as inner parts of the separating means lying there between.

29. The transport system according to claim 26, characterized in that at least one of the transverse rear and transverse front frame profile has a body of a metallic material and that said body is surrounded by a carbon fiber material which is wound around the body.

30. The transport system according to claim 29, wherein the metallic material comprises aluminum.

31. The transport system according to claim 26, characterized in that each longitudinal frame profile has upper parts which extend in over longitudinal edge portions of an upper part of the convey belt, that each longitudinal frame profile has lower parts which extend in under longitudinal edge portions of a lower part of the conveyor belt, that each longitudinal frame profile has a groove which is engaged by the separating means, and that the separating means and the longitudinal frame profiles are fixedly connected or attached to each other.

32. The transport system according to claim 31, characterized in that each longitudinal frame profile includes an outer rail having a substantially C-shaped cross section and defining the upper and lower parts of the frame profile, that each longitudinal frame profile includes an inner rail which is fixedly connected or attached to the outer rail and which has a substantially U-shaped cross section such that it defines an inwardly directed groove, and that the separating means engages said groove, whereby the separating means and the inner rail are fixedly connected to each other.

33. The transport system according to claim 22, characterized in that the system comprises a second frame structure and a third frame structure, each located beside each other and the first frame structure, that the driving device on an intermediate frame structure includes at least one driving motor, at least one drive shaft protruding therefrom and at least two drive gears driven or operated by the driving motor and cooperating with driving belts forming part of the conveyor belt on said first frame structure, and that the driving device on two outer frame structures has shafts which through universal or cardan devices can be connected to the drive shaft protruding from the driving motor and which each includes two drive gears which cooperate with transport belts forming part of the conveyor belt on said outer frame structures.

34. The transport system according to claim 33, characterized in that at least one of first and second positioning and retaining means is provided for at least one of setting and retention of the frame structures in predetermined mutual positions relative to each other in their longitudinal directions and for setting and retention of the frame structures at predetermined mutual distances from each other.

35. The transport system according to claim 33, characterized in that at least one first cover means can be provided between two adjacent frame structures for covering longitudinal gaps therebetween, and that each first cover means is attached to longitudinal frame profiles of two adjacent frame structures.

36. The transport system according to claim 35, characterized in that at least one second cover means is provided in front of each conveyor belt for covering said belt from the front, and that at least one third cover means is provided in front of a gap between the conveyor belts for covering gaps between said two first conveyor belts.

37. The transport system according to claim 33, characterized in that a wall extending in traverse direction relative to the conveyor belts of the first frame structure, is common to the conveyor belts of all three frame structures, that the transverse wall is connected to all three conveyor belts such that it is brought along therewith during their transport movement, that at least one transverse support beam for supporting the transverse wall is connected to and extends from one outer conveyor belt to the other outer conveyor belt, and that said support beam is located at a distance above the conveyor belt of the intermediate frame structure.

38. The transport system according to claim 1, characterized in that a separating means between an upper and a lower part of the conveyor belt is a plate-like means of sandwich type and comprises inner parts which are honeycomb shaped and which include aramid fibers or aluminum, and that the plate-like means includes a lower layer of a carbon fiber material, which is provided on the inner parts of honeycomb type, and an upper layer of a carbon fiber material, which is also provided on the inner parts of honeycomb type.

39. The transport system according to claim 1, characterized in that the convey belt comprises a transport mat having a net structure with fiber threads running substantially in and transverse to the transport direction of the transport mat, said fiber threads being at least one of provided and designed such that the transport mat is considerably more rigid in transverse than in longitudinal direction relative to its transport direction.

40. The transport system according to claim 39, characterized in that the transverse fiber threads of the transport mat comprise carbon and glass fibers in a carbon and glass fiber layer and the longitudinal fiber threads comprise aramid fibers and form part of an upper carbon and glass fiber layer, which above the longitudinal fiber threads of aramid fibers comprises fiber threads of aramid fibers running crosswise relative to each other and at about 45° relative to said transport direction.

41. The transport system according to claim 1, characterized in that front parts of three transport devices located beside each other in a first group are provided or substantially provided on a first line extending straight or directly into the cargo space from a first side edge of a door opening through which goods can be loaded into and unloaded from the cargo space.

42. The transport system according to claim 41, characterized in
that the first group and a second group comprising three transport devices which are located beside each other, are provided in the cargo space,
that front parts of the transport devices of the first group are provided or substantially provided on the first line extending straight into the cargo space from a first side edge of a door opening through which goods can be loaded into and unloaded from the cargo space, and
that front parts of the three transport devices of the second group may be provided or substantially provided on a second line extending straight into the cargo space from a second side edge of the door opening, such that between the transport devices of the first group and the second group, there is a free space within the door opening.

43. A transport system in cargo spaces in aircrafts,
said transport device comprising a first frame structure which by means of retaining devices is provided at the fuselage in the cargo space,
wherein the first frame structure includes at least one conveyor belt for transport and storage of goods in the cargo space,
characterized in that the retaining devices are provided to retain the first frame structure at the fuselage such that the first frame structure can move in said retaining devices when the first frame structure is subjected to abnormally high loads in order to prevent damage on the aircraft body, and wherein each retaining device includes at least one elongated flexible means which is located between the first frame structure and the fuselage and which permits movement of the first frame structure relative thereto, wherein the transport system further comprises:
a second frame structure is located beside the first frame structure, wherein each said retaining device comprises two of said at least one elongated flexible means,
that each elongated flexible means is connected to a frame structure,
that each elongated flexible means are provided in parallel or substantially in parallel with each other,
that one lower tightening element is provided for each elongated flexible means, and
that an upper tightening element is provided for both elongated flexible means.

44. A transport device in cargo spaces in aircrafts,
said transport device comprising a first frame structure which by means of retaining devices is provided at the fuselage in the cargo space,
wherein the first frame structure includes at least one conveyor belt for transport and storage of goods in the cargo space,
characterized in that the retaining devices are provided to retain the first frame structure at the fuselage such that the first frame structure can move in said retaining devices when the first frame structure is subjected to abnormally high loads in order to prevent damage on the aircraft body, and wherein each retaining device includes at least one elongated flexible means which is located between the first frame structure and the fuselage and which permits movement of the first frame structure relative thereto, wherein,
said at least one elongated flexible means is connected to the first frame structure by a lower tightening element provided on the first frame structure, an upper tightening element and a tightening screw, and
that the lower and upper tightening elements can be tightened together around said at least one elongated flexible means.

45. The transport system according to claim 44, characterized in
that the first frame structure and at least one second frame structure are located beside each other, and
that each elongate flexible means is mounted on the respective frame structure by means of a first lower and upper tightening element and a tightening screw cooperating with an associated elongated flexible means which cooperates with an associated frame structure.

* * * * *